United States Patent
Fischer et al.

(10) Patent No.: US 7,070,244 B2
(45) Date of Patent: Jul. 4, 2006

(54) ROAD MILLING MACHINE

(75) Inventors: Stefan Fischer, Wiefelstede (DE); Gerold Wöbken, Elsfleth (DE)

(73) Assignee: Metso Dynapac GmbH (DE)

( * ) Notice: Subject to any disclaimer, the term of this patent is extended or adjusted under 35 U.S.C. 154(b) by 0 days.

(21) Appl. No.: 10/387,294

(22) Filed: Mar. 12, 2003

(65) Prior Publication Data

US 2003/0178884 A1    Sep. 25, 2003

(30) Foreign Application Priority Data

Mar. 12, 2002    (DE) ................ 102 10 763

(51) Int. Cl.
*E01C 23/088*    (2006.01)
*E01C 23/12*    (2006.01)

(52) U.S. Cl. ............... 299/39.4; 280/124.111

(58) Field of Classification Search ........ 280/124.111, 280/124.112, 124.113; 299/39.1, 39.4, 39.6
See application file for complete search history.

(56) References Cited

U.S. PATENT DOCUMENTS

| | | | | |
|---|---|---|---|---|
| 1,282,667 A | * | 10/1918 | Adams | 180/41 |
| 1,826,113 A | * | 10/1931 | Winsor | 280/124.113 |
| 2,796,717 A | * | 6/1957 | Orelind et al. | 56/209 |
| 3,160,221 A | * | 12/1964 | Boone | 180/41 |
| 3,806,141 A | * | 4/1974 | Janer | 280/6.156 |
| 5,533,790 A | * | 7/1996 | Weiland | 299/1.5 |

FOREIGN PATENT DOCUMENTS

| | | | |
|---|---|---|---|
| DE | 199 57 048 C1 | | 8/2001 |
| JP | 52-62818 | * | 5/1977 |
| WO | 1001088 | * | 5/2000 |
| WO | WO 02/103117 | * | 12/2002 |
| WO | 1270817 | * | 1/2003 |

OTHER PUBLICATIONS

Fachbeitrage Strassensanierung, Seite 12 Heft (Oct. 1999).

* cited by examiner

*Primary Examiner*—Sunil Singh
(74) *Attorney, Agent, or Firm*—Laurence P. Colton; Powell Goldstein LLP

(57) ABSTRACT

This invention is road milling machine with a chassis (13) having at least four wheels of which the front four wheels (14) are assigned to a parallelogram steering axle (23). The parallelogram steering axle (23) guides the front wheels (14) such that their wheel axles (48) remain in constant horizontal alignment even when the front wheels (14) run at different heights.

2 Claims, 4 Drawing Sheets

ROAD MILLING MACHINE

DESCRIPTION

Figure 1:
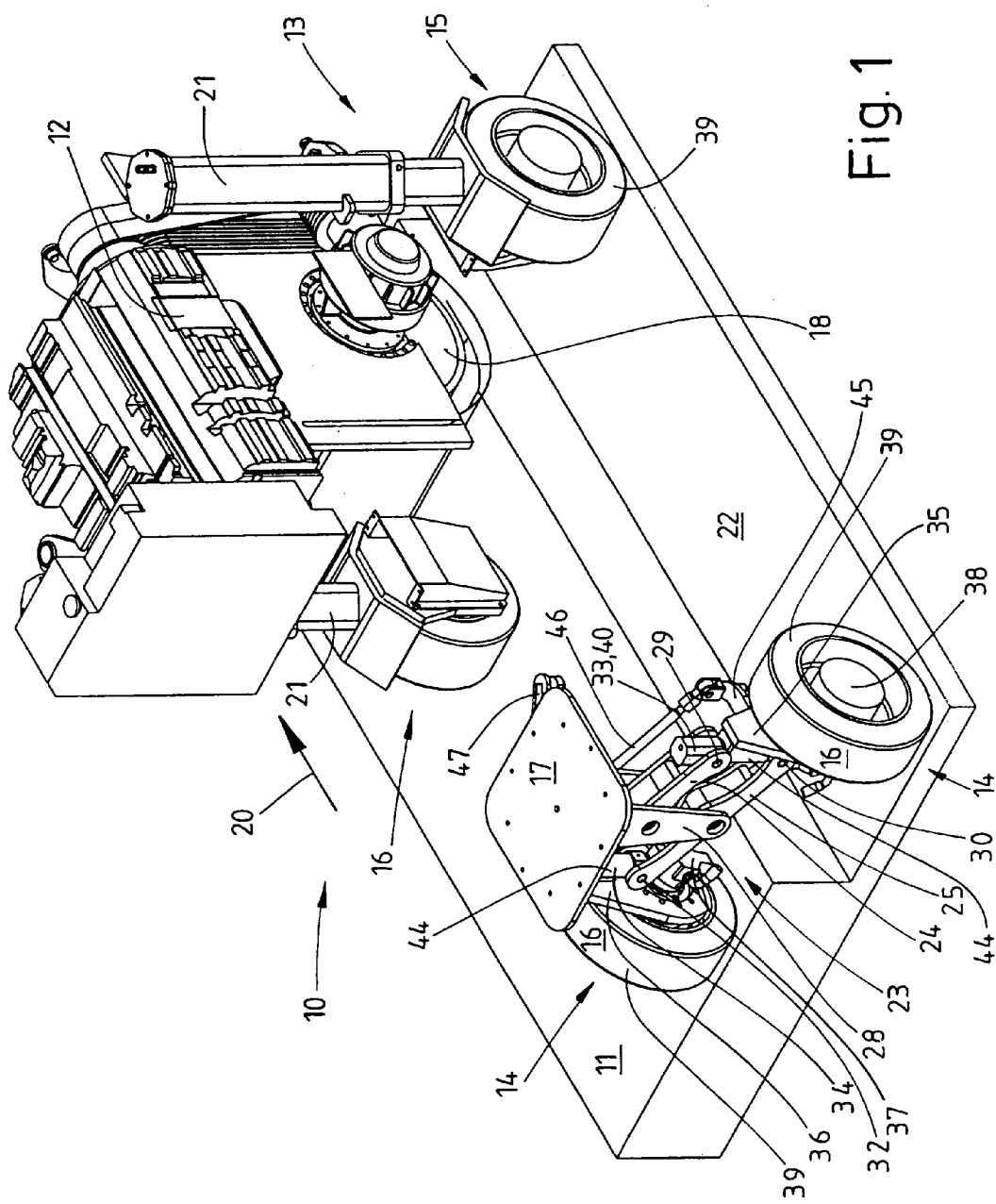

The invention relates to a road milling machine with a chassis having at least four wheels of which two steerable wheels with solid-rubber tires are assigned to an axle.

Road milling machines are employed to remove the entire paving surface of defective roads by means of milling. A milled street serves as the bed for a street to be repaired where only the application of a new road surface is required.

Known road milling machines feature at least one milling drum driven by a horizontal shaft axle. The milling drum is mounted on the frame of a chassis. The chassis has at least one pair of front wheels and at least one pair of rear wheels. The front wheels are located in front of the milling drum, as seen in the direction of milling. The milling drum is aligned by adjusting the vertical spacing of the wheels to the frame. Milling of the road surface is usually conducted with a horizontally oriented milling drum. This is accomplished by setting the rear wheels at a corresponding vertical distance from the frame. The front wheel are mounted on the chassis in a manner that allows them to track uneven road sections and compensate for them automatically. For this purpose, the front wheels of known road milling machines are suspended on a full floating axle. When the full floating axle is skewed, the wheels roll on their edges, which not only results in non-uniform wear of the wheels' solid rubber tread but also hampers the steering of the road milling machine, particularly on straight stretches of road. This is particularly evident when there is a considerable difference of height between the front wheels, such as when one of the two front wheels runs on a previously milled section which is deeper than the track of the neighboring front wheel running on an non-milled section.

Proceeding from the above, the object of the invention is to create a mad milling machine with front wheels whose vertical distance to the frame are automatically adjustable such that the front wheels can compensate for uneven surfaces or for a previously milled track in the pavement without encountering the disadvantages stated above.

A road milling machine for attaining this object has a chassis having at least four wheels of which two steerable wheels with solid-rubber tires are assigned to an axle. By having the steerable wheels in particular the front wheels, assigned to a parallelogram steering type axle, the wheel axles of these wheels retain their horizontal alignment even when the wheels, particular the front wheels, are disposed at differing heights with respect to the frame. Even when a front wheel runs along a deeper track that has already been milled, the wheel, although disposed at a lower position with respect to the adjacent wheel as a result, remains constantly aligned by the parallelogram steering axle which can pivot in an approximately vertical place perpendicular to the longitudinal direction of the chassis, thus keeping the wheel axles of the wheels in horizontal alignment. The full width of the solid rubber treads of the wheels (solid-rubber wheels) thus contact the fundament of the street to be milled, thus ensuring a precise steering action of the road milling machine and avoiding uneven wear across the width of the wheel treads.

The invention also provides for a parallelogram steering axle having two parallel levers arranged one above the other and mounted on the chassis frame, it being possible to pivot each lever in an approximately vertical plane about a central bearing or horizontal axis. The opposing ends of both levers therefore remain essentially above one another vertically in all pivoted positions. The superimposed ends of both levers are pin-jointed on each end of the lever by a respective coupling piece. A wheel bearing of each wheel, in particular a front wheel, is arranged at the respective coupling piece. Due to the fact that the superimposed ends on both sides of the levers remain vertically above one another in every position, the coupling pieces maintain a vertical alignment independently of the pivot position of the levers. Thus the direction of the wheel bearings do not change with respect to the wheels when the levers of the parallelogram steering axle pivot along a vertical plane perpendicular to the longitudinal direction of the chassis. The wheel bearings are merely moved up and down with the wheels in a vertical path so that when one wheel moves upwards, the opposite wheel moves approximately the same distance downwards.

The coupling pieces are mounted at the end of the levers about a horizontal swiveling axis that run perpendicular to the horizontal wheel axles. This makes it possible to change the direction of the levers with respect to the coupling pieces during pivoting of the levers but still keep the coupling pieces in their vertical alignment. The invention also provides for linking the coupling pieces at the ends of the levers to vertical rotation axles in the longitudinal direction of the coupling pieces. This makes it possible to turn the front wheels about these vertical rotation axles along with the wheel bearings and at least parts of the coupling pieces. In this manner the vertical axles form steering axles for guiding the wheels. To ensure that the wheels on opposite ends of the levers can be steered parallel or synchronous to each other, the two coupling pieces at the opposite ends of the levers are preferably mechanically connected by a tie rod, for example. However, it is also conceivable to have the tie rods or the like mounted directly on the wheel bearings. It is also possible to synchronize the front wheels by means of pressure actuation or by cables or chains in order to achieve a steering angle of equal size.

Further dependent claims relate to advantageous developments of the road milling machine.

Figure 2:
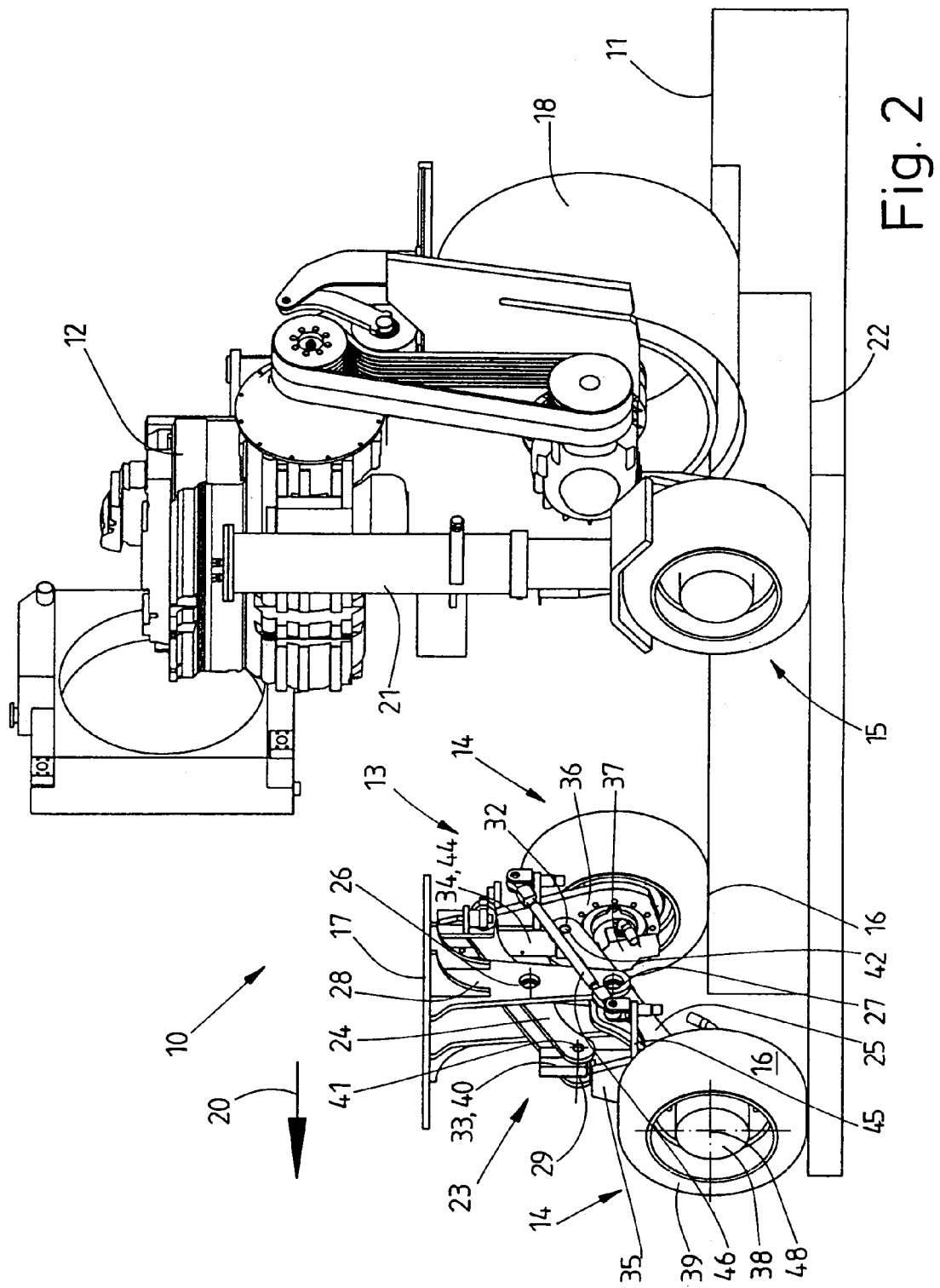
Figure 3:
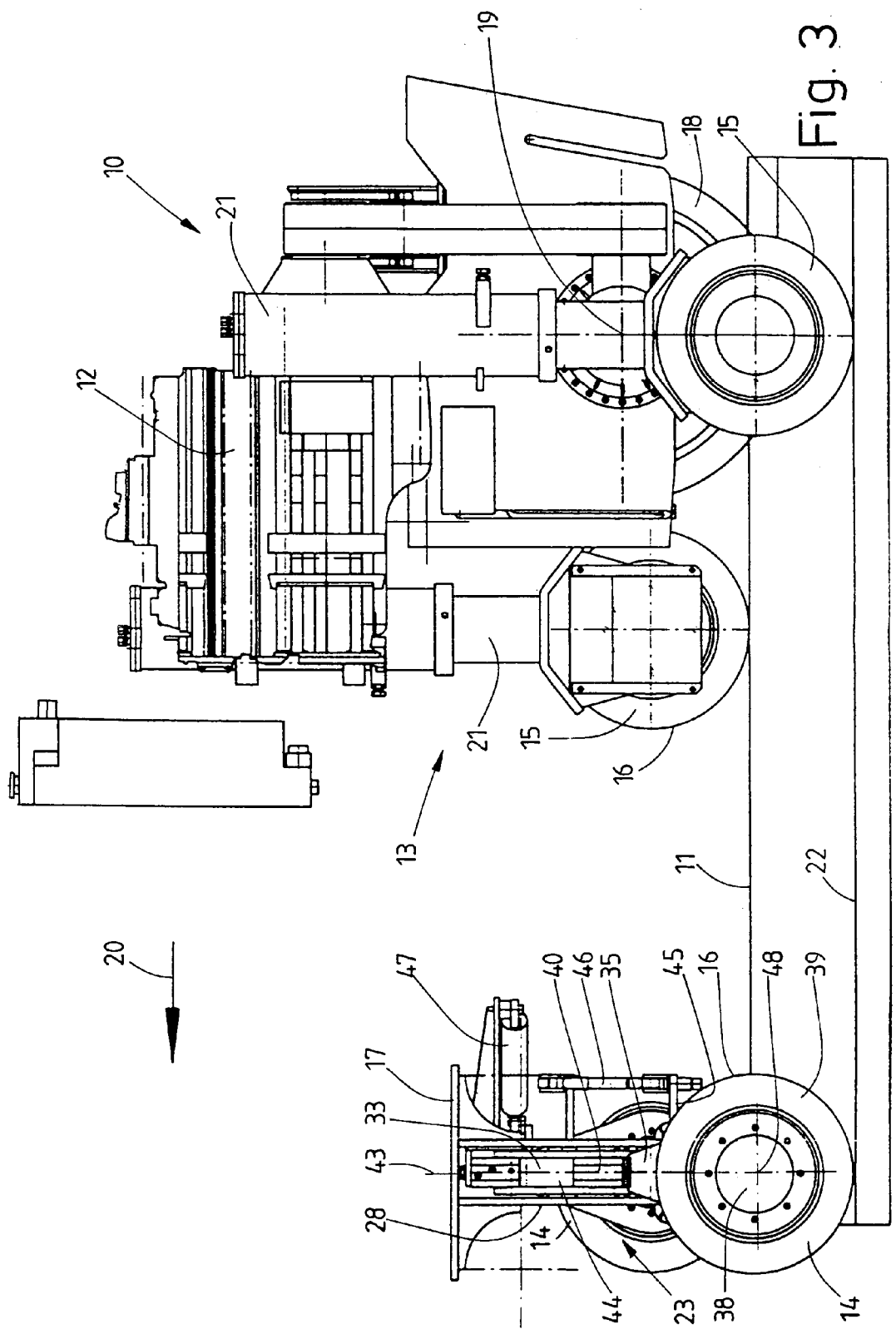
Figure 4:
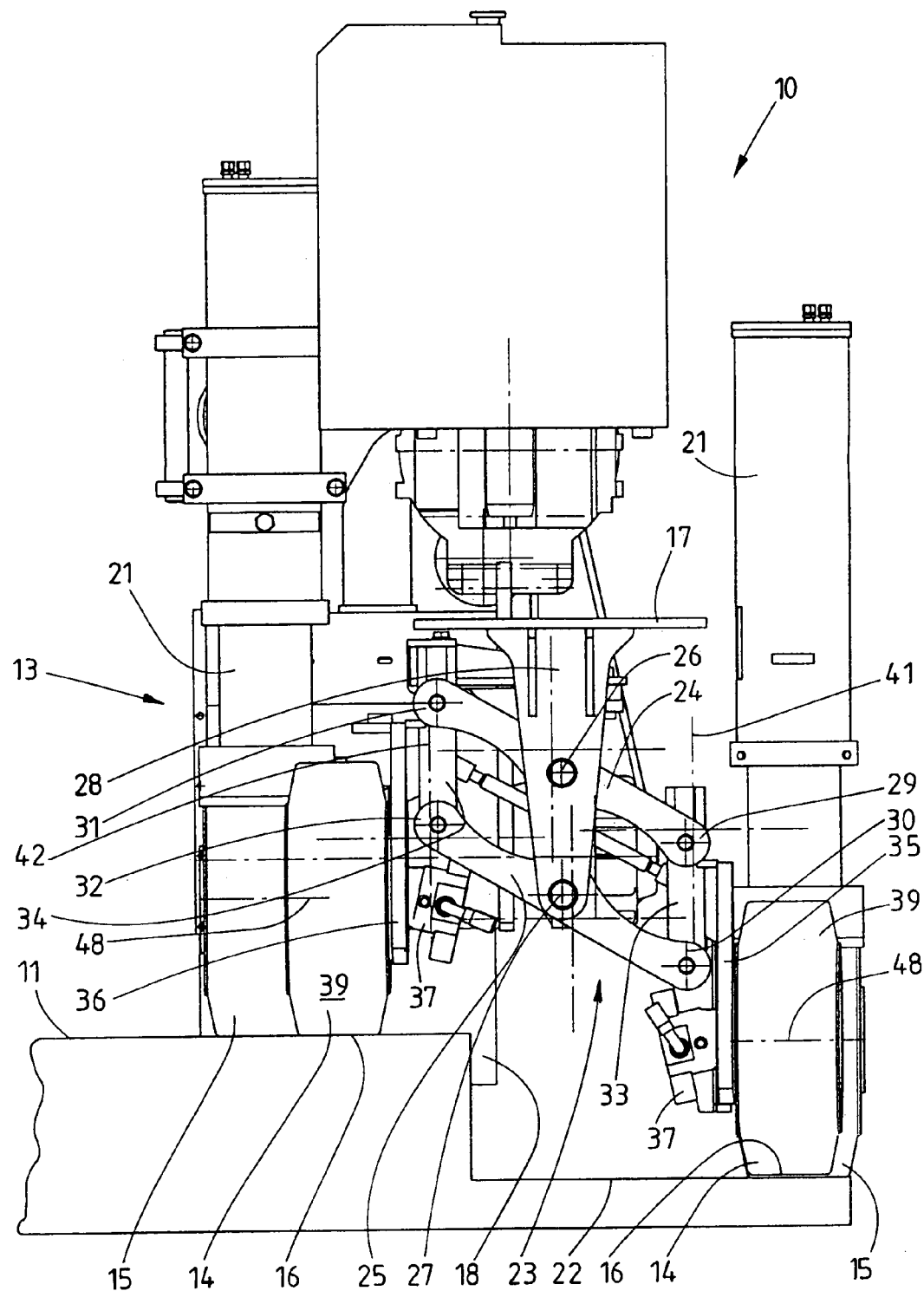

A preferred exemplary embodiment of the inventive road milling machine is described in more detail below by means of the drawing which shows:

FIG. 1 a perspective view of part of the road milling machine (at a front angle), FIG. 2 a perspective view of the road milling machine in FIG. 1 (at a rear angle), FIG. 3 a side view of the road milling machine in FIGS. 1 and 2, and FIG. 4 a front view of the road milling machine.

The figures show part of a road milling machine 10 for milling defective and/or deteriorated road surfaces 11. The road milling machine 10 has an automotive design and is therefore provided with an appropriate drivetrain. The drivetrain is powered by an internal combustion engine 12 which drives a hydraulic pump, which in turn is used to drive hydraulic motors.

The road milling machine 10 shown here has a chassis 13, which in the shown exemplary embodiment features four wheels, specifically two front wheels 14 and two rear wheels 15. Both the front wheels 14 and the rear wheels 15 are provided with solid-rubber tires. The treads 16 of the front wheels 14 and the rear wheels 15 are therefore also made of solid rubber. The front wheels 14 and preferably also the rear wheels 15 are driven separately, each by a hydraulic motor 37 configured as a drive motor.

The chassis 13 has a frame 17 which bears a milling drum 18. The cylindrical milling drum 18 can be driven about a centered horizontal rotation axis. The horizontal rotation axis 19 of the milling drum 18 runs perpendicular to a milling direction 20 of the road milling machine 10. The front wheels 14 are located in front of the rear wheels 15 as seen in the milling direction 20. When necessary, one of the rear wheels 15 can be swiveled so that it is located in front of the milling drum 18 as seen in the milling direction 20. The figures show the road milling machine 10 with a rear wheel 15 disposed in front of the milling drum 18. But the invention can also be utilized for road milling machines where both rear wheels 15 lie at opposite sides of the milling drum 18. The two rear wheels 15 are themselves independently arranged in the known manner at the lower ends of upright lifting columns 21. By virtue of the lifting columns 21 the rear wheels 15 can be moved up and down along a vertical axis independently of one another so that the vertical distance of the rear wheels 15 from the frame 17 is adjustable. This means that the road milling machine 10, independent of the topography of the road surface 11 can always be aligned to ensure that the rotation axis 19 of the milling drum 18 remains horizontal. This applies in particular to the case shown in the figures, where a rear wheel 15, namely the rear wheel 15 located next to an end face of the milling drum 18, runs on a milled track 22 of the road surface 11 or of the road bed. This milled track 22 is lower than the yet non-milled road surface 11 on which the second rear wheel 15 runs (FIG. 1). The given difference in height between the non-milled road surface 11 and the milled track 22 is offset in that the lifting column 21 associated with the rear wheel 15 travelling on the milled track 22 is extended further than the lifting column 21 associated with the other rear wheel 15. The lifting column 21 with the rear wheel 15 travelling on the milled track 22 is extended far enough until the rotation axis 19 of the milling drum 18 assumes an approximately horizontal alignment (FIG. 3).

In a manner special to the invention, the front wheels 14 with solid rubber tires are coupled on the frame 17. The front wheels 14 are namely connected to the frame 17 by a parallelogram steering axle 23 that can be pivoted in a upright plane. The parallelogram steering axle 23 essentially has two levers 24 and 25 arranged in a vertical plane running perpendicular to the milling direction 20. The levers 24 and 25 run together in the manner of a parallelogram. Mounted on a bearing block 28 permanently fixed to the frame 17, the superimposed levers 24 and 25 can be swiveled about a horizontal axis 26 and 27, respectively, running along the milling direction 20. The levers 24 and 25 have free ends 29, 30 and 31, 32, respectively, located on either side of the bearing block 28 and which are respectively connected by means of a coupling piece. The identical coupling pieces in the shown exemplary embodiment are configured as coupling journal 33, 34. Each coupling journal 33, 34 is permanently connected to a wheel bearing 35, 36 of the respective front wheel 14. Each wheel bearing 35, 36 is assigned its own hydraulic motor 37 for driving the respective front wheel 14. The hydraulic motors 37 propel the hubs 38 of the front wheels 14. The hubs 38 are surrounded by a ring-like solid-rubber tire 39 with cylindrical tread 16.

Each coupling journal 33, 34 is hinge-mounted by means of an elongate core part 40 to the superimposed ends 29, 30 and 31, 32, respectively, at each end of the two superimposed levers 24, 25. The bearings of the core parts 40 are hinged at each end 29, 30 and 31, 32 so that the core parts 40 of the coupling journals 33, 34 can be pivoted with respect to the ends 29, 30 and 31, 32, respectively, of the levers 24, 25 about a horizontal swiveling axis 41 running parallel to the milling direction 20.

The coupling journals 33, 34 can also be swiveled about their preferably vertical longitudinal axis 43. To this end an outer sleeve 44 is rotatably mounted on the core part 40 of each coupling journal 33, 34. The outer sleeve 44 on each core part 40 of the coupling journals 33, 34 extends between the ends 29, 30 and 31, 32 of the superimposed levers 24, 25. The outer sleeve 44 cannot be displaced on the respective core part 40 in the longitudinal direction. The associated wheel bearing 35, 36 of the respective front wheel 14 is permanently attached to the outer sleeve 44 of each coupling journal 33, 34. The front wheels 14 can be steered by rotating the outer sleeves 44 of the coupling journals 33, 34 about the (vertical) longitudinal axes 43 of the coupling journals 33, 34. To ensure synchronous steering of both front wheels 14, the outer sleeves 44 of the coupling journals 33, 34 preferably have lever arms 45 of equal length. The lever arms 45 of the front wheels 14 associated with the opposite ends 29, 31 and 30, 32 of the levers 24, 25 are connected to each other by means of a tie rod 46. A steering drive 47 is assigned to a coupling journal 33 or to its associated wheel bearing 35 (FIG. 3). The preferably hydraulic-powered steering drive 47 is employed to swivel the two front wheels 14 uniformly about the vertical longitudinal axes 43 of the coupling journals 33, 34, thus guiding the road milling machine 10 to follow the course of the road surface 11 to be milled.

The parallelogram steering axle 23 is configured such that the front wheels 14 can be moved up and down along an imaginary rectilinear, vertical path. The center wheel axles 48 of the front wheels 14 thus run in a constant horizontal alignment, regardless of whether the distance of each front wheel 14 from the frame 17 is the same or different. When one front wheel 14 runs along a lower milled track 22 and the other front wheel 14 is located on the higher yet non-milled road surface 11, as shown in particular detail in FIG. 4, the wheel axles 48 of the front wheels 14 run parallel to one another, with both wheel axles 48 being aligned horizontally. The consistently horizontal alignment of the wheel axles 48 of both front wheels 14 is achieved in that the two levers 24 and 25 of the parallelogram steering axle 23 are of the same length, the levers 24 and 25 are swivel-mounted on the bearing block 28 of the frame 17 and centered on the vertically superimposed axes 26 and 27, both levers 24 and 25 run parallel to each other and all ends 29, 30, 31 and 32 of the levers 24 and 25 have the same distance from the center axes 26 and 27 of the levers 24, 25. The described dimensions of the parallelogram steering axle 23, in particular of the levers 24 and 25, ensure that the longitudinal 43 of the coupling journals 33 and 34 are consistently held in vertical alignment by the levers 24 and 25 when the levers 24 and 24 are held horizontally as well as when the levers 24 and 25 they are swiveled out of the horizontal in uniform and parallel fashion. Consequently the wheel axles 48 of the wheel bearing 35 and 36 constantly remain in a horizontal position, regardless of whether the levers 24 and 25 of the parallelogram steering axle 23, which are always disposed parallel to each other, assume horizontal positions or are more or less swiveled with respect to the horizontal. The wheel bearings 35, 36 with the front wheels 14 are merely moved up and down—specifically in opposite directions on parallel vertical paths by the same vertical displacement—by the levers 24, 25 of the parallelogram steering axle 23 which can be swiveled in a common vertical plane. The cylindrical treads 16 of the front wheels 14 therefore remain in contact the subsurface across their entire width even when one of the front wheels 14 runs on a lower, milled track 22, as shown in particular detail in FIG. 4. The depth of the milled track 22 plays no role in this case. By virtue of the inventive parallelogram steering axle 23, the wheel axles 48 of both front wheels 14 always run in horizontal alignment. Naturally the two front wheels 14 are also supported over their entire width by the road surface 11 when both front wheels 14 travel over the yet non-milled road surface 11 and both levers 24 and 25 assume a horizontal direction, with the wheel axles 48 also being in horizontal alignment. In this case (not shown) the wheel axles 48 of both front wheels 14 are aligned along a common horizontal axis.

| List of designations | |
|---|---|
| 10 | road milling machine |
| 11 | road surface |
| 12 | internal combustion engine |
| 13 | chassis |
| 14 | front wheel |
| 15 | rear wheel |
| 16 | tread |
| 17 | frame |
| 18 | milling drum |
| 19 | rotation axis |
| 20 | milling direction |
| 21 | lifting column |
| 22 | milled track |
| 23 | parallelogram steering axle |
| 24 | lever (upper) |
| 25 | lever (lower) |
| 26 | axis |
| 27 | axis |
| 28 | bearing block |
| 29 | end |
| 30 | end |
| 31 | end |
| 32 | end |
| 33 | coupling journal |
| 34 | coupling journal |
| 35 | wheel bearing |
| 36 | wheel bearing |
| 37 | hydraulic motor |
| 38 | hub |
| 39 | solid-rubber tire |
| 40 | core part |
| 41 | swiveling axis |
| 42 | swiveling axis |
| 43 | (vertical) longitudinal axis |
| 44 | outer sleeve |
| 45 | lever arm |
| 46 | tie rod |
| 47 | steering drive |
| 48 | wheel axle |

The invention claimed is:

1. Road milling machine with a chassis (13) having at least four wheels and a cylindrical milling drum (18) mounted on the chassis and driven about a horizontal axis of rotation, comprising:

two steerable front wheels (14) with axles (48) assigned to a front axle, at least two non-steerable rear wheels with horizontal axles assigned to a rear axle, the rear wheels being movable up and down on vertical axes independent of one another, and at least one of the rear wheels can be swiveled so that it is located in front of the milling drum, two motors (37), one of the two motors being assigned to each of the front wheels respectively for driving each of the respective front wheels, and outer sleeves (44) rotatably mounted on coupling pieces (33, 34) and attached to wheel bearings (35, 36) on each of the respective front wheels, wherein the front wheels are steered by rotating the outer sleeves wherein the front axle with the steerable wheels is configured as a parallelogram steering axle (23) such that the steerable wheels move up and down relative to each other and to the chassis in mutually opposite directions, the wheels on one side of the chassis run in a track that has already been milled and is deeper than the track on which the wheels on the other side of the chassis run, and the axles of the two steerable wheels maintain a uniform horizontal alignment, wherein the parallelogram steering axle has two levers (24, 25), running parallel to and above one another, which are pivotably mounted on a bearing block (28) of the chassis and which can be swiveled about center axes (26, 27), and adjacent ends (29 and 30; 31 and 32) of the levers are respectively connected by means of the coupling pieces assigned to the wheel bearing of the respective steerable front wheel, whereby the chassis and the milling drum are maintained in a horizontal alignment during a road milling process.

2. Road milling machine with a chassis (13) having at least four wheels and a cylindrical milling drum (18) mounted on the chassis and driven about a horizontal axis of rotation, comprising:

two steerable front wheels (14) with axles (48) assigned to a front axle, at least two non-steerable rear wheels with horizontal axles assigned to a rear axle, the rear wheels being movable up and down on vertical axes independent of one another, and at least one of the rear wheels can be swiveled so that it is located in front of the milling drum, and outer sleeves (44) rotatably mounted on coupling pieces (33, 34) and attached to wheel bearings (35, 36) on each of the respective front wheels, wherein the front wheels are steered by rotating the outer sleeves, wherein the front axle with the steerable wheels is configured as a parallelogram steering axle (23) such that the steerable wheels move up and down relative to each other and to the chassis in mutually opposite directions, and the axles of the two steerable wheels maintain a uniform horizontal alignment, wherein the parallelogram steering axle has two levers (24, 25), running parallel to and above one another, which are pivotably mounted on a bearing block (28) of the chassis and which can be swiveled about center axes (26, 27), and adjacent ends (29 and 30; 31 and 32) of the levers are respectively connected by means of the coupling pieces assigned to the wheel bearings of the respective steerable front wheel, whereby the chassis and the milling drum are maintained in a horizontal alignment during a road milling process.

* * * * *